Sept. 16, 1969    N. A. HIRSCH    3,466,711
FASTENER FOR HANDBAG STRAP
Filed Oct. 5, 1967
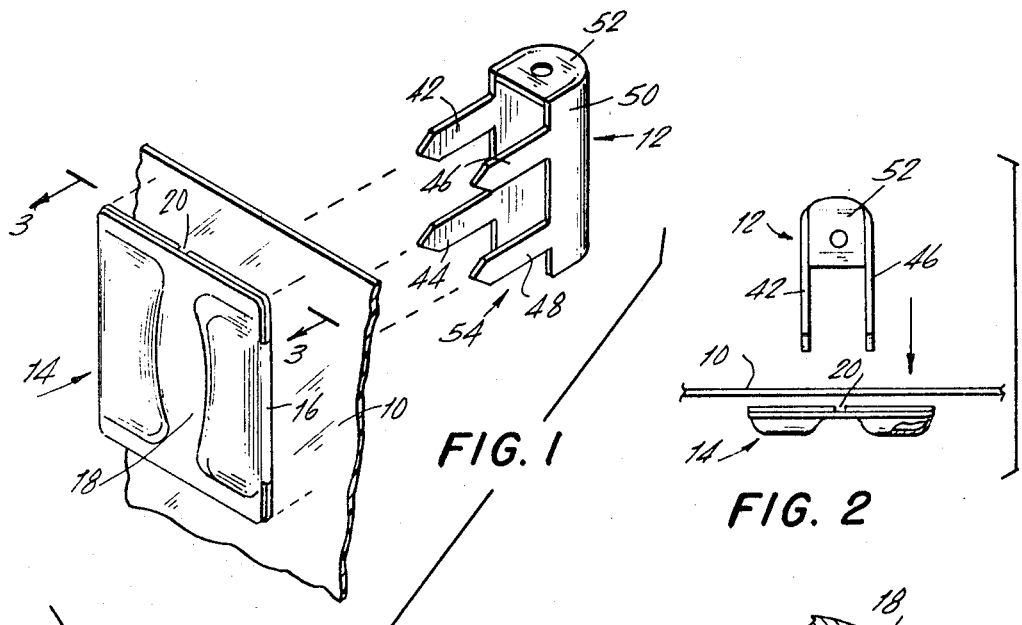
FIG. 1
FIG. 2
FIG. 5
FIG. 3
FIG. 4
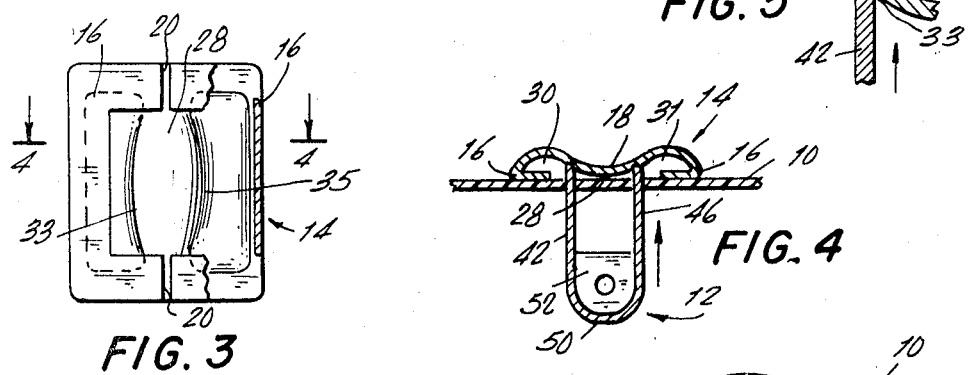
FIG. 6
FIG. 8
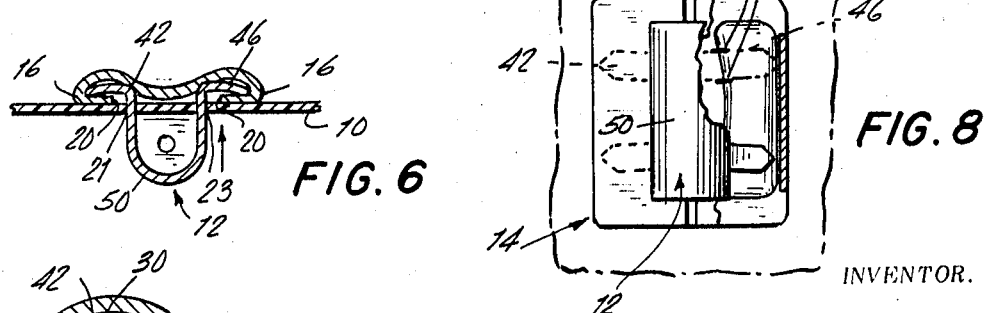
FIG. 7
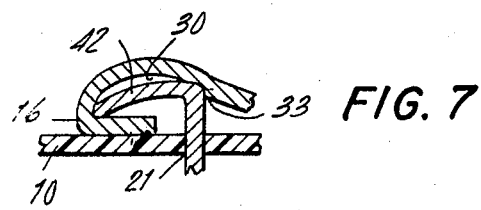
INVENTOR.
BY Nathan A. Hirsch
Friedman & Goodman
ATTORNEYS

United States Patent Office 3,466,711
Patented Sept. 16, 1969

3,466,711
FASTENER FOR HANDBAG STRAP
Nathan A. Hirsch, Brooklyn, N.Y., assignor to Albest Metal Stamping Corporation, Brooklyn, N.Y.
Filed Oct. 5, 1967, Ser. No. 673,104
Int. Cl. A45c *13/12;* A44b *1/42*
U.S. Cl. 24—95                           1 Claim

ABSTRACT OF THE DISCLOSURE

A fastener of the permanent type comprising a backwasher having a central bulge and a pair of recesses one each on either side of said bulge, said bulge having a concave-convex arcuate shape tapering into the recesses.

BACKGROUND OF THE INVENTION

Field of the invention

This invention relates to a fastener. More particularly, this invention relates to a backwasher comprising a portion of the fastener, said fastener being of the permanent type.

Discussion of the prior art

Many fastening means provided for women's handbags and the like are known. Many of these comprise as a receiving and locking means a backwasher. A typical backwasher comprises a stamped metal piece provided with a pair of recesses to receive prongs of a male fastening member. Between the recesses there is provided a central bulge and over the recesses there is a covering member normally integral with the other parts of the backwasher. A male fastening member comprising at least two prongs is fastened to the backwasher by insertion of prongs into a space provided above the central bulge. The prongs are then bent into the recesses which are partially covered and, if desired, pressure is applied to both sides of the backwasher containing the prongs to secure the prongs in rigid position and complete the fastening. Unfortunately, while in many cases the prior art fasteners were suitable, there was still observed some play within the backwasher of the prongs. Naturally, it became desirable to eliminate this by providing a backerwasher which due to its design helped lock the prongs in place in the recesses.

SUMMARY OF THE INVENTION—OBJECTS OF THE INVENTION

It is an object of this invention, therefore, to provide a fastener of the permanent type useful in women's handbags and the like.

It is another object of this invention, therefore, to provide a fastener of the permanent type comprising a backwasher having a distinctive shape which assists in locking inserted prongs into place.

These and other objects and advantages will become apparent from the following complete description and appended claim.

STATEMENT OF THE INVENTION

Broadly, this invention contemplates a backwasher comprising a central bulge, a pair of recesses one each on either side of said central bulge, and a cover over at least a portion of each recess and connected to said backwasher, said central bulge having a concave-convex arcuate shape along its length and tapering into the recesses.

In a particularly desirable embodiment of this invention, the male fastening member for insertion into the backwasher of this invention comprises two pairs of prongs, each pair spaced on either lateral sides of the fastener and facing the other pair, each prong of said pair spaced along the length of said fastener, each prong provided with a point, said point having a burr on the inside surface.

BRIEF DESCRIPTION OF THE DRAWINGS

The invention can be more readily understood by reference to the accompanying drawings, in which:

FIGURE 1 is an exploded view of the backwasher and male fastener member of this invention preparatory to fastening a piece 10 between the backwasher and the male member;

FIGURE 2 is a plan elevation of the view shown in FIGURE 1;

FIGURE 3 is a sectional view taken along the line 3—3 of FIGURE 1, partially broken away;

FIGURE 4 is a sectional view taken along the line 4—4 of FIGURE 3;

FIGURE 5 is an enlarged view of a portion of FIGURE 4;

FIGURE 6 is a view similar to FIGURE 4 showing the male fastener member in position within the recesses of the backwasher;

FIGURE 7 is an enlarged view of a portion of FIGURE 6; and

FIGURE 8 is a back view of the fastening assembly with the prongs in locked position, the figure being partially broken away.

DESCRIPTION OF PREFERRED EMBODIMENT

A preferred embodiment of this invention is illustrated in the figures in which the fastener and backwasher assembly is shown attached to a sheet of material 10, such as the material of a lady's handbag. The assembly comprises a male fastener member 12 and a backwasher 14.

The backwasher 14 comprises a rectangular metal plate folded over upon itself at inside edges 16 to provide an integral cover on either side of the backwasher for the recesses discussed below. The end portions on the rectangular metal plate have their end edges 20 closely spaced from each other forming a front plate. The end edges 20 can be in contact with one another. The back plate 18 is bent so as to form a central bulge 28 with recesses 30 and 31 on either side thereof. Central bulge 28 has a concave-convex shape in that it comprises two arcuate shaped sides both of which bow outwardly toward edge 16. Each arcuate side 33 and 35 of the central bulge tapers downwardly into the recesses 30 and 31. The backwasher is suitably formed of stamped steel sheet metal.

The male member 12 of the fastener assembly is also suitably formed of stamped steel sheet metal and consists of four prongs 42, 44, 46 and 48. Prongs 42 and 44 comprise a pair of longitudinally spaced prongs, while prongs 46 and 48 comprise a second pair of longitudinally spaced prongs. Each pair faces one another and each prong is provided with a pointed end. On the inside of the point there is preferably provided a burr which contributes additional fastening properties as more fully discussed below. The prongs are attached, preferably integral with, a head portion 50 in the form of a hollow semicylinder provided with end tabs 52 and 54 having a hole therein. Thus, if desired a chain or similar item can be drawn through the holes of tabs 52 and 54 and through the cylinder hollow for fastening onto sheet 10.

Due to provision of the central bulge with the concave-convex arcuate shape discussed above, additional fastening is provided to maintain head portion 50 rigid with the backwasher. This is provided due to the fact that when the prongs are passed through apertures 21 and 23 and meet the tapering sides of the concave-convex central bulge they are caused to flare outward from one another and at the same time, especially when a burr is provided on the prongs, a groove caused by the directing effect of the central bulge 28 is made in the inside surface of the back plate 18. Thus, not only is each prong flared outwardly but it is caused to rest in its own self-made groove. This causes a double locking effect not obtained without utilization of the specially designed and shaped central bulge 28. For instance, no flaring effect as seen in FIGURE 8 of the specification is observed or provided in prior art backwashers having a central bulge having generally parallel longitudinal sides. The tapering effect locks the male fastener member more securely because it is anchored over a greater portion of the backwasher. Thus, if any pressure is applied to the assembly, although not necessary, the prongs exert even a greater locking effect due to being in the flared position.

In operation, the backwasher 14 is placed under a sheet of material 10. A chain or other object is passed through the hole in end tab 52, through the hollow of head portion 50 and through the hole in tab 54. The prongs are passed through apertures 21 and 23 of the backwasher and are flared outward, as seen in FIGURE 8, when they strike the concave-convex tapering sides of central bulge 28. One pair of prongs enters recess 30 and the other enters recess 31 where upon entering each is caused to form a groove in which it rests in locked position as seen in FIGURES 4, 6 and 7.

I claim:

1. A fastener comprising a backwasher and a male fastening element therefor, said backwasher being provided with a centrally positioned bulge, a pair of recesses one on either side of said bulge and a cover over at least a portion of each recess and connected to said backwasher, said centrally positioned bulge having a concave-convex arcuate shape along its length and tapering into said recesses, said male fastening element being provided with two pairs of prongs one pair on either side of a fastener head, each prong maintained in a recess of said backwasher under said cover and projecting outwardly in said recesses from said centrally positioned bulge and wherein each prong has a groove forming burr on the inside thereof and sits in its own self-made groove in the respective recesses.

References Cited

UNITED STATES PATENTS

| | | | |
|---|---|---|---|
| 1,988,233 | 1/1935 | Berendt | 24—95 |
| 2,975,495 | 3/1961 | Wolf et al. | 24—95 |
| 3,213,501 | 10/1965 | Damast | 24—95 |

DONALD A. GRIFFIN, Primary Examiner